US008973958B2

(12) United States Patent
Allen Demers et al.

(10) Patent No.: US 8,973,958 B2
(45) Date of Patent: Mar. 10, 2015

(54) GRIPPER HAVING A TWO DEGREE OF FREEDOM UNDERACTUATED MECHANICAL FINGER FOR ENCOMPASSING AND PINCH GRASPING

(71) Applicant: Robotiq Inc., Saint-Nicolas (CA)

(72) Inventors: Louis-Alexis Allen Demers, Saint-Nicolas, CA (US); Simon Lefrançois, St-Nicolas (CA); Jean-Philippe Jobin, Levis (CA)

(73) Assignee: Robotic Inc., Saint-Nicolas, QC (CA)

( * ) Notice: Subject to any disclaimer, the term of this patent is extended or adjusted under 35 U.S.C. 154(b) by 0 days.

(21) Appl. No.: 14/360,357

(22) PCT Filed: Nov. 23, 2012

(86) PCT No.: PCT/CA2012/050844
§ 371 (c)(1),
(2) Date: May 23, 2014

(87) PCT Pub. No.: WO2013/075245
PCT Pub. Date: May 30, 2013

(65) Prior Publication Data
US 2014/0265401 A1 Sep. 18, 2014

Related U.S. Application Data

(60) Provisional application No. 61/563,691, filed on Nov. 25, 2011.

(51) Int. Cl.
*B66C 1/00* (2006.01)
*B66C 1/42* (2006.01)
*B25J 15/08* (2006.01)
*B25J 15/00* (2006.01)
*B25J 15/02* (2006.01)
*B25J 15/10* (2006.01)

(52) U.S. Cl.
CPC .............. *B25J 15/08* (2013.01); *B25J 15/0009* (2013.01); *B25J 15/0266* (2013.01); *B25J 15/10* (2013.01); *B25J 15/022* (2013.01); *Y10S 901/39* (2013.01)
USPC ............................................. 294/106; 901/39

(58) Field of Classification Search
USPC ......... 294/106, 198, 87.22, 213, 111; 901/38, 901/39; 623/64
See application file for complete search history.

(56) References Cited

U.S. PATENT DOCUMENTS

| | | | | |
|---|---|---|---|---|
| 5,062,855 A * | 11/1991 | Rincoe | ............................ | 623/24 |
| 5,108,140 A * | 4/1992 | Bartholet | ...................... | 294/106 |
| 5,570,920 A * | 11/1996 | Crisman et al. | ............... | 294/111 |
| 8,342,586 B2 * | 1/2013 | Sim | ................................ | 294/106 |
| 8,720,964 B2 * | 5/2014 | Birglen | ......................... | 294/106 |

* cited by examiner

*Primary Examiner* — Stephen Vu
(74) *Attorney, Agent, or Firm* — Anglehart et al.

(57) ABSTRACT

A mechanical gripper being adapted to automatically perform a stable pinch grasp and an encompassing grasp and a method of determining a system geometry thereof. The gripper comprising at least one mechanical finger comprising. The at least one mechanical finger comprising a first phalanx and a second phalanx that are pivotally connected. When a load is applied on a stable pinch grasp region, an actuation mechanism is adapted to allow the second phalanx to translate and allow its contact surface to maintain a constant orientation in order to automatically perform a pinch grasp, when a load is applied on the first phalanx or below the stable pinch grasp region, the actuation mechanism is adapted to allow the second phalanx to pivot and automatically perform an encompassing grasp.

17 Claims, 23 Drawing Sheets

GRIPPER HAVING A TWO DEGREE OF FREEDOM UNDERACTUATED MECHANICAL FINGER FOR ENCOMPASSING AND PINCH GRASPING

TECHNICAL FIELD

The present relates to the field of grippers used in robotics and other applications, and more specifically to underactuated mechanical grippers. These grippers are also referred to as underactuated hands and underactuated end effectors.

BACKGROUND

Most grippers available nowadays are designed for a single task. They are usually simple, robust and cheap. Unfortunately they are not very flexible and can, most of the time, only grasp few types of objects. These grippers are commonly used in industrial applications for grasping tasks. They have only few degrees of freedom (DOF). In fact, most of them have one DOF and one actuator.

Other grippers are designed to be more flexible and are able to grasp a large variety of objects. Moreover, most of these types of grippers are not only able to grasp objects but can also manipulate them, as does the human hand.

Unfortunately, these grippers (or mechanical hands) are more complex, fragile, apply small grip forces compared to conventional grippers, costly and difficult to control and integrate to a system. These grippers have several DOF and actuators and are even sometimes equipped with tactile sensors.

Finally, other grippers are designed to merge the advantages of the latter two cases. This is possible by using a mechanical concept called underactuation. An underactuated gripper is a gripper that has less actuator than DOF. The basic concepts of underactuation are presented in more details in Hirose et al. (Hirose, S., Umetani, Y.: The development of soft gripper for the versatile robot hand. Mechanism and Machine Theory 13, 351-358 (1978)) and in Shimojima et al. (Shimojima, H., Yamamoto, K., Kawakita, K.: A study of grippers with multiple degrees of mobility, JSME International Journal 30(261), 515-522 (1987)). This leads to grippers that are flexible, robust and powerful without the disadvantages of having several actuators (cost and complexity).

Underactuation can be achieved by using tendons such as disclosed in U.S. Pat. No. 3,694,021 to Mullen, U.S. Pat. No. 5,200,679 to Graham and U.S. Pat. No. 5,080,681 to Erb. Typically, the tendon-based mechanisms can provide less force to the load and suffer from friction and compliance problems. Hence, they are less suitable for industrial applications requiring large grip force or repeatability.

Underactuation can further be achieved using mechanisms such as bars or gears. Underactuated fingers using bars or gears have been made with two phalanges such as disclosed in U.S. Pat. No. 3,927,424 to Itoh or with three phalanges such as disclosed in U.S. Pat. No. 4,834,443 to Crowder et al. Even though it is possible to have a plurality of phalanges, it is not a popular design since it leads to a much more complex design without adding significant versatility.

The above mentioned references disclose underactuated fingers that are capable of providing an encompassing grasp or an enveloping grasp of an object. However, these references do not disclose underactuated fingers that are capable of providing a so called pinch grasp where an object is picked up using only distal phalanges of at least two fingers. To accomplish this pinch grasp, the distal phalanges must maintain a parallel orientation with respect to each other as they travel toward each other for grasping an object in a pinching manner just as with industrial parallel jaw grippers. This type of grasping is very important in the industry, since it ensures a better precision on the positioning of the object than with the encompassing grasp. Also, many types of objects or situations require to use the pinch grasp. One can think for instance at a small object lying on a desk where the pinch grasp is the only suitable way of taking it.

For doing the pinch grasp, the distal phalanges must stay parallel to each other automatically and without the use of an algorithm. Such a feature was first proposed in U.S. Pat. No. 5,108,140 to Bartholet. This reference discloses a gripper having underactuated fingers with two phalanges. A cam mechanism is integrated in a double parallelogram for allowing the gripper to provide both pinch and encompassing grasps. Unfortunately such a cam mechanism is complicated to fabricate and imprecise.

A similar solution is proposed in U.S. Pat. No. 5,762,390 to Gosselin et al. There is disclosed a gripper with fingers with three phalanges using an additional series of bars arranged in a parallelogram fashion. Again, the gripper is complex and requires an extensive number of parts thereby negatively affecting the robustness of the gripper and the cost of fabrication.

In US Patent Publication 2010/0181792 to Birglen, there is disclosed a gripper that has fingers with at least three phalanges. In order to avoid using an additional series of bars, each finger has triggered elements between the first two phalanges. Although the complexity of this mechanism is decreased in comparison to the solution proposed by Gosselin et al., it is sensitive to interference between the phalanges and the transmission linkages.

Further disclosed in the Birglen reference, there is a simplified gripper having two-phalanx fingers. As presented in FIG. 23 of the publication, there is the gripper for providing a pinch preshaping. The gripper has a five-bar mechanism that includes the finger, its base and the transmission linkage. The same inventor also published a paper on the subject in L. Birglen, "The kinematic preshaping of triggered self-adaptative linkage-driven robotic fingers", published in Mechanical Sciences, Vol. 2, pp. 41-49, 2011. The study presented in this paper relies on triggered elements using a spring and a mechanical limit situated on a same joint. To obtain a pinch preshaping, one of the joint requires being locked during the closing sequence of the finger, leaving the phalanges to follow a 4-bar motion. The length of the bars is therefore studied to obtain a parallelogram and ensure that the distal phalanx is kept perpendicular to the palm of the robotic hand until a contact occurs. When this contact is established, the actuation torque will overcome the preloading of the triggered element and initiate the closing of the other phalanx. However when this contact is established above the equilibrium point, the actuation torque will overcome the preloading of the triggered element and initiate the opening of the distal phalanx, thereby possibly causing a contacted object to be ejected.

According to Birglen, the desired pinch grasp is made and is maintained if the contact with the object to be grasped occurs at a particular location on the distal phalanx, called equilibrium point. For a linear contact, Birglen states that the pinch is stable if and only if the location of the equilibrium point is located between both vertices of the line, as shown in FIG. 1. In FIG. 1, Birglen illustrates the geometric behavior of the gripper depending on the position of a contacting object 12 with respect to the equilibrium point (14A, 14B and 14C) of the gripper 10. There is illustrated that the object 12 contacting the distal phalanx of the gripper above the equilibrium point 14A or below the equilibrium point 14C renders an unstable geometry of the gripper. Stability of the gripper geometry can only be achieved when the object 12 contacts the distal phalanx of the gripper right on the equilibrium point 14B. As a pinch grasp can only be provided when the gripper geometry is stable, with Birglen's gripper the object must contact the precise equilibrium point location to provide a pinch grasp.

The objective of the study in Birglen's paper is to maximize the value of the equilibrium point (14A, 14B and 14C). In other words, Birglen tries to obtain an equilibrium point that is as close as possible to the distal end 16 of the distal phalanx. In fact, Birglen assumes that the linear contact is long enough to exceed the tip of the distal phalanx, so an equilibrium point situated near the end of the phalanx will most likely be located between both vertices of the line.

While the maximization of the equilibrium location done by Birglen guarantees the finger to be always stable, the resulting behavior is to accomplish encompassing grasp for most of the contact situations, since a contact made under the equilibrium point leads to an encompassing grasp. As mentioned above, the triggered element in Birglen is used for maintaining the distal phalanx in a perpendicular orientation with respect to the palm before contacting an object. Once a contact occurs, there is disclosed that the actuation torque overcomes the preloading of the triggered element and the motion of the second phalanx is dependent on the position of the contact with respect to the equilibrium point of the finger.

As explained above, the pinch grasp is very important in the industrial field to ensure the precision of the placement and is even necessary to pick certain types of objects, such as small parts. The finger disclosed by Birglen is only capable of providing a pinch grasp when a contact occurs at a very precise location that is the equilibrium point of the finger. When a contact occurs within a portion of the finger that is right below or right above the equilibrium point, the pinch grasp cannot be provided.

In addition to the underactuation between the phalanges of a finger, it is also possible to obtain underactuation between the fingers of a same hand. This will further decrease the number of actuators while maintaining the same number of degrees of freedom. This principle has been disclosed for the actuation of many fingers, for example in U.S. Pat. No. 5,378,033 to Guo et al., and in the literature, see for example the article by G. Guo, X. Qian and W. A. Gruver, "A Single-DOF Multi-Function Prosthetic Hand Mechanism with an Automatically Variable Speed Transmission", published in the Proceedings of the ASME Mechanisms Conference, Phoenix, Vol. DE-45, pp. 149-154, 1992, and the article by M. Rakik, "Multifingered Robot Hand with Selfadaptability", published in Robotics and Computer-Integrated Manufacturing, Vol. 5, No. 2-3, pp. 269-276, 1989. In these references, each of the fingers has only one degree of freedom, i.e. the motion of the phalanges is coupled.

Gosselin et al. in turn discloses an underactuation of the phalanges of a finger in combination with an underactuation of the fingers of a hand. For convenience, this principle is termed hyperunderactuation.

In U.S. Pat. No. 3,901,547 to Skinner II and in Guo et al. there is disclosed a gripper having a coupling with gears or grooves for changing the orientation of fingers with respect to one another with only one actuator. The motion of each finger about an axis perpendicular to the palm of the mechanical hand is actuated with only one actuator by coupling their orientation. This is possible through the use of a four-bar mechanisms that connects the base of the fingers, thereby decreasing the number of degrees of actuation and freedom of the system.

SUMMARY

It has been discovered that an underactuated two-phalanx finger with two degrees of freedom (DOF) can be adapted to have a relatively low equilibrium point while still being adapted to automatically provide both an encompassing grasp and a pinch grasp.

It has been discovered that an underactuated two-phalanx finger with two DOF can be adapted to have an acceptable stable pinch grasp region for a load object to be automatically pinch grasped when the finger has a relatively low equilibrium point.

It has been further discovered that an underactuated two phalanx finger that is pivotally connected to a palm can still provide an encompassing grasp for a large variety of objects even when the finger has a relatively low equilibrium point.

The geometry of the underactuated finger is such that it is possible to perform either one of an encompassing grasp or a pinch grasp automatically without using a sensor or an algorithm. The finger is adapted to encompass or pinch a large variety of objects having various shapes and sizes while still being simple, robust and cost-effective to manufacture.

There is a gripper that provides at least a finger with two phalanges and two degrees of freedom for powerful and versatile grippers in order to facilitate their uses in a variety of areas such as in industrial or service robotics. The gripper can be used in a variety of applications such as in assembly lines, mobile manipulation in structured or unstructured environments, teleoperation, jig-less robotic welding, machine tending, parts sorting, bin picking, parts transfer, etc. Because of the variety of applications of the gripper, the above and other objectives of the gripper are realized in a variety of embodiments.

According to one aspect, there is provided a mechanical gripper that is adapted to automatically perform a stable pinch and an encompassing grasp. The gripper comprises at least one mechanical finger. The at least one mechanical finger comprises two phalanges that are pivotally connected. The first phalanx has a proximal end that is pivotally connectable to a base or to any other suitable type of body. The second phalanx is pivotally connected at a proximal end to the distal end of the first phalanx. The second phalanx has a contact surface that is adapted to contact a load such as an object that is to be grasped.

The mechanical finger further comprises a differential actuation mechanism that is connected to the second phalanx. The actuation mechanism defines at least in part a stable pinch grasp region on the contact surface. When a load is applied on the stable pinch grasp region, the actuation mechanism is adapted to allow the second phalanx to translate and allow its contact surface to maintain a constant orientation in order to automatically perform a pinch grasp. When a load is applied on the first phalanx or below the stable pinch grasp region, the actuation mechanism is adapted to allow the second phalanx to pivot and automatically perform an encompassing grasp.

According to one mechanical gripper, the stable pinch grasp region has a longitudinal length that measures at least twenty percent of a longitudinal length of the contact surface, as the second phalanx travels from a fully open position to a fully closed position.

According to one other mechanical gripper, a geometry of the differential actuation mechanism is determined according to a geometry of the first phalanx and a desired stable pinch grasp region.

According to one other mechanical gripper, the first phalanx is pivotally connected at the proximal end to a base and the base has a palm surface. The palm surface is adapted to stabilize a load when performing the encompassing grasp.

According to one other mechanical gripper, the first phalanx is pivotally connected at the proximal end to a base such as to allow the at least one mechanical finger transversally fork over and span across the base.

According to one other mechanical gripper, the actuation mechanism comprises a first link and a second link. The first link is pivotally connected at a proximal end to a base. The second link is pivotally connected at a proximal end to a distal end of the first link and is pivotally connected at a distal end to the second phalanx.

In one instance, the second link comprises a stopper at a proximal end. The stopper is adapted to maintain the contact surface in a transversal orientation with respect to the base when no load is applied to the at least one mechanical finger or when a load is applied to the stable pinch grasp region.

In another instance, the at least one finger is biased to engage the stopper.

In another instance, the first and second links and the first and second phalanges are pivoting about parallel pivot axes.

In yet another instance, a proximal pivot of the first link is actuated.

According to one other mechanical gripper, the second phalanx comprises a flexion stopper to prevent the second phalanx to rotate beyond a predetermined angle.

According to one other mechanical gripper, the gripper comprises two mechanical fingers that are oppositely spaced apart. The mechanical fingers are oriented with respect to each other so as to together provide a pinch grasp of a load when the load is applied within the stable pinch grasp region.

In one instance, each of the at least one mechanical finger is connected to a single drive mechanism and the single drive mechanism is for driving a corresponding one of the actuation mechanism.

In one other instance, the two mechanical fingers are connected to a single drive mechanism. The single drive mechanism is adapted to drive the actuation mechanism of both two mechanical fingers.

According to yet another embodiment, the mechanical gripper comprises an additional mechanical finger that is pivotally connected in opposition with the at least one mechanical finger. The additional mechanical finger defines a similar stable pinch grasp region. The additional mechanical finger is oriented with respect to the at least one mechanical finger so as to provide a pinch grasp of a load when the load is applied within the stable pinch grasp region of both the at least one mechanical finger and the additional mechanical finger.

According to another aspect, there is a method of determining a system geometry of a mechanical finger. The method comprises determining a first geometry of a first phalanx and a second phalanx. The first and second phalanges being pivotally connected. The method further comprises determining a second geometry of a differential actuation mechanism according to the first geometry and a desired stable pinch grasp region of the second phalanx. The differential actuation mechanism being pivotally connected to the second phalanx.

According to one instance, the determining a second geometry is also according to a force that is required within the stable pinch grasp region for effectively performing a pinch grasp.

According to one other instance, the determining a first geometry and the determining a second geometry is according to an acceptable dimension of the system geometry.

BRIEF DESCRIPTION OF THE DRAWINGS

The invention will be better understood by way of the following detailed description of embodiments of the invention with reference to the appended drawings, in which.

DETAILED DESCRIPTION

Figure 2A:
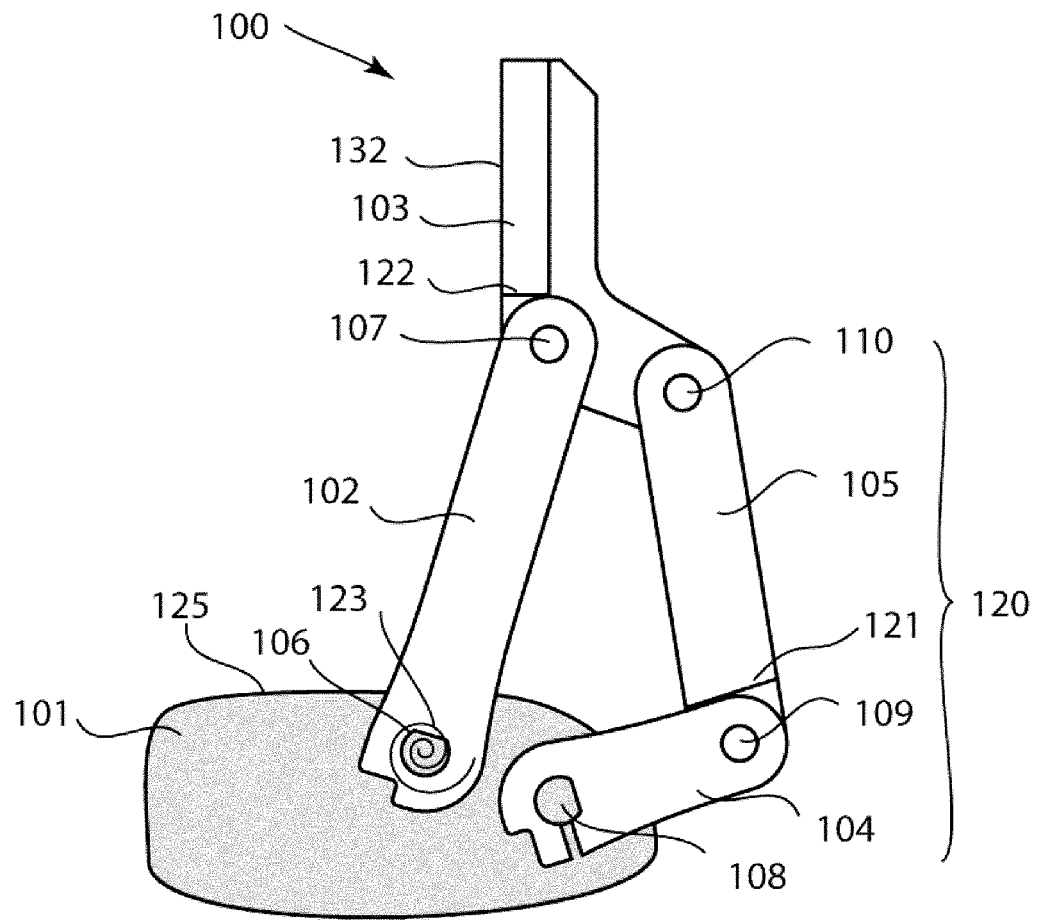
FIG. 2A is a front view representation of a gripper having a finger that has a system geometry for providing a stable pinch grasp region at a contact surface of a second phalanx of the finger, according to one embodiment.

According to one embodiment, there is presented in FIG. 2A an underactuated finger 100. The finger 100 is pivotally connected to a mechanical casing 101 and is composed of two phalanges: a first phalanx 102 and a second phalanx 103. The first phalanx 102 is pivotally connected to the mechanical casing 101 with a proximal connection joint 106. The second phalanx 103 is pivotally connected to the first phalanx 102 with a distal connection joint 107.

Motion is transmitted to the two phalanges (102 and 103) via a differential actuation mechanism 120. According to one embodiment, the actuation mechanism 120 has a first link 104 and a second link 105. The first link 104 is pivotally connected at a proximal end to the mechanical casing 101 with a proximal connection joint 108. The first link 104 is also pivotally connected at a distal end to the second link 105 with a median connection joint 109. The second link 105 is pivotally connected at a distal end to the second phalanx 103 with distal connection joint 110.

A skilled person will understand that the connection joints (108, 109 and 110) could be any type of connector such as a revolute joint or any other type of joint that allows a pivotal movement in each connection of the links (104 and 105).

Further presented in FIG. 2A, the motion of the finger 100 is initiated by an activated rotation of the proximal connection joint 108, according to one embodiment. A mechanical stopper 121 is machined directly in the second link 105 in such a way that, when that stopper 121 is engaged, the second phalanx 103 is transversely oriented with respect to a palm 125 of the mechanical casing 101.

A skilled person will understand that the actuated joint could be any of the joints 108, 109 or 110.

Figure 2B:
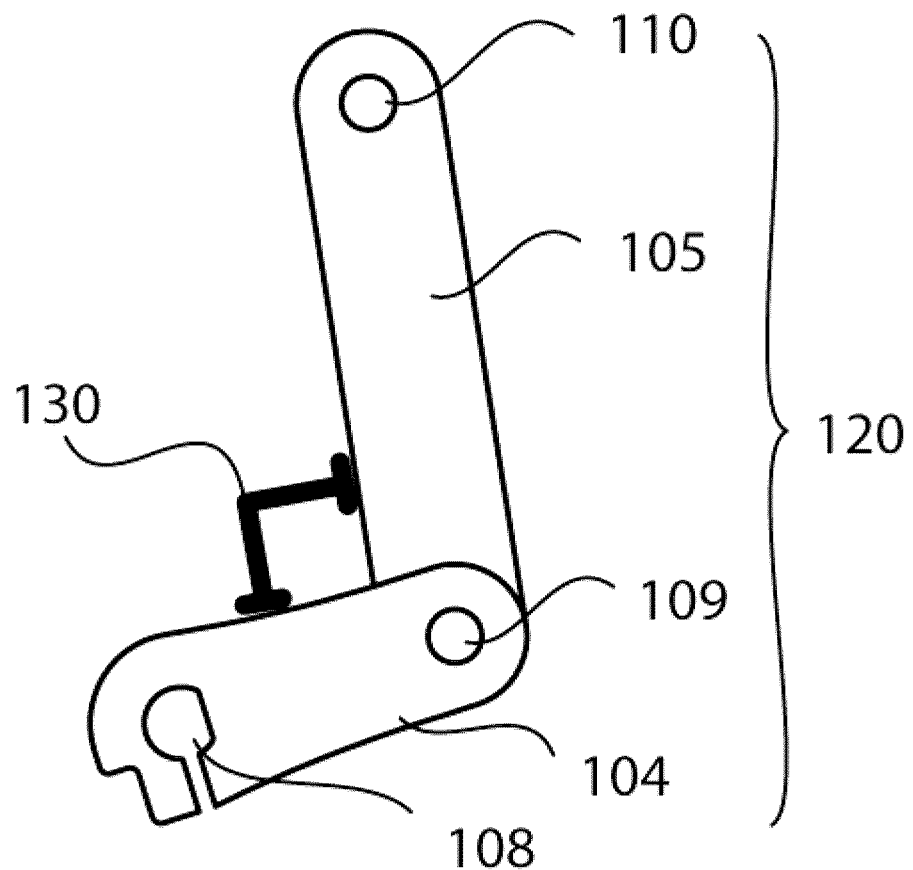
FIG. 2B is a front view representation of an actuation mechanism of the finger having a protruding blocking member, according to one embodiment.

A skilled person will also understand that the mechanical stopper 121 could be of any other type of stopping mechanism to allow the second phalanx 103 to remain transversely oriented with respect to the palm 125. The mechanical stopper 121 may be machined in any one of the links (104 or 105). The mechanical stopper 121 may be integrated in anyone of the joints (108, 109 or 110) that is not an actuated joint. Moreover, the mechanical stopper may be a blocking member of any suitable shape or form such as a protruding blocking member 130 as presented in FIG. 2B.

Further presented in FIG. 2A, there is a flexion stopper 122 that is machined directly in the second phalanx 103 to prevent flexion of the distal connection joint 107 beyond a predetermined angle, according to one embodiment. The flexion stopper 122 determines a maximum rotation of the second phalanx 103 with respect to the first phalanx 102. It is understood that the flexion stopper 122 could be of any shape or form that is suitable to prevent the distal connection joint 107 to flex beyond the predetermined angle.

Further presented in FIG. 2A, according to one embodiment at the proximal connection joint 106 there is inserted a resilient element 123 such as a torsion spring 123. The torsion spring 123 allows maintaining the mechanical finger 100 in an extended position where the contact surface 132 is orientated transversely with respect to the palm 125. In the extended position, the finger 100 is properly oriented to do a pinch grasp.

A skilled person will understand that the torsion spring 123 could be replaced by any other type of biasing means. The biasing means could be located on any one of the connection joints (106, 107, 108, 109 or 110) without departing from the scope of the claimed invention, as long as the associated joint is not an actuated joint.

According to one embodiment, one end of the torsion spring 123 is attached to the mechanical casing 101 while the other end is attached to the axle of the proximal connection joint 106. The torsion spring 123 keeps the mechanical stopper 121 engaged as long as a load isn't applied on one of the phalanges (102 or 103) below an equilibrium point of the two phalanges.

The resilient element 123 and the mechanical stopper 121 may be co-located or may be located at a different joint. Some might find it advantageous to locate the resilient element 123 at the proximal connection joint 106. In a case where the proximal connection joint 106 is positioned at an inner side of the mechanical casing 101, the resilient element 123 would be protected from various ambient residues such as dust, oil and dirt. This way, the life of the gripper may be extended and maintenance cost may be reduced.

Figure 2C:
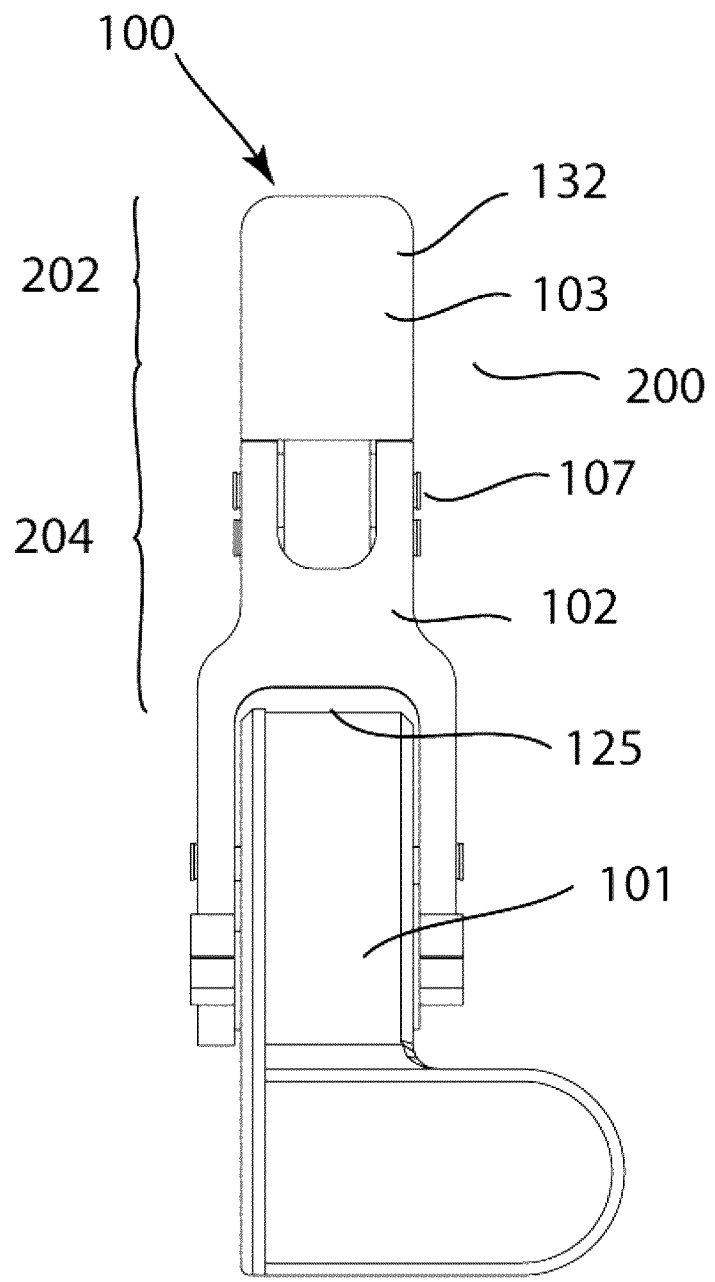
FIG. 2C is a side view representation of the finger defining a stable pinch grasp region and an encompassing grasp region, according to one embodiment.

Presented in FIG. 2C is a front view of the finger 100 where there is drawn a line 200 representing the equilibrium point across the contact surface 132. The equilibrium point line 200 defines a limit between a stable pinch grasping region 202 and a encompassing grasp region 204. When a load is applied on the stable pinch grasping region 202, the finger 100 is adapted to operate for providing a pinch grasp (i.e. where only a tip of the finger 100 such as contact surface 132 contacts the object 250). When a load is applied on the encompassing grasp region 204, the finger 100 is adapted to operate for providing an encompassing grasp (i.e. where the finger 100 wraps around the object 250, as presented in FIG. 2F).

According to one aspect of the present, the finger 100 has a relatively low equilibrium point line 200 on the second phalanx 102. The equilibrium point line 200 is near the distal connection joint 107 and the stable pinch grasping region 202 defines a major portion of the contact surface 132.

In a five-bar mechanism, to manufacture the finger 100 where the equilibrium point line 200 is relatively low, the following phalanx proportions (i.e. phalanx length, angles of the joints with respect to each other) must be respected. This allows to provide both a stable pinch grasp and stable encompassing grasp while maximizing the length of the stable pinch grasping region 202.

Figure 2D:
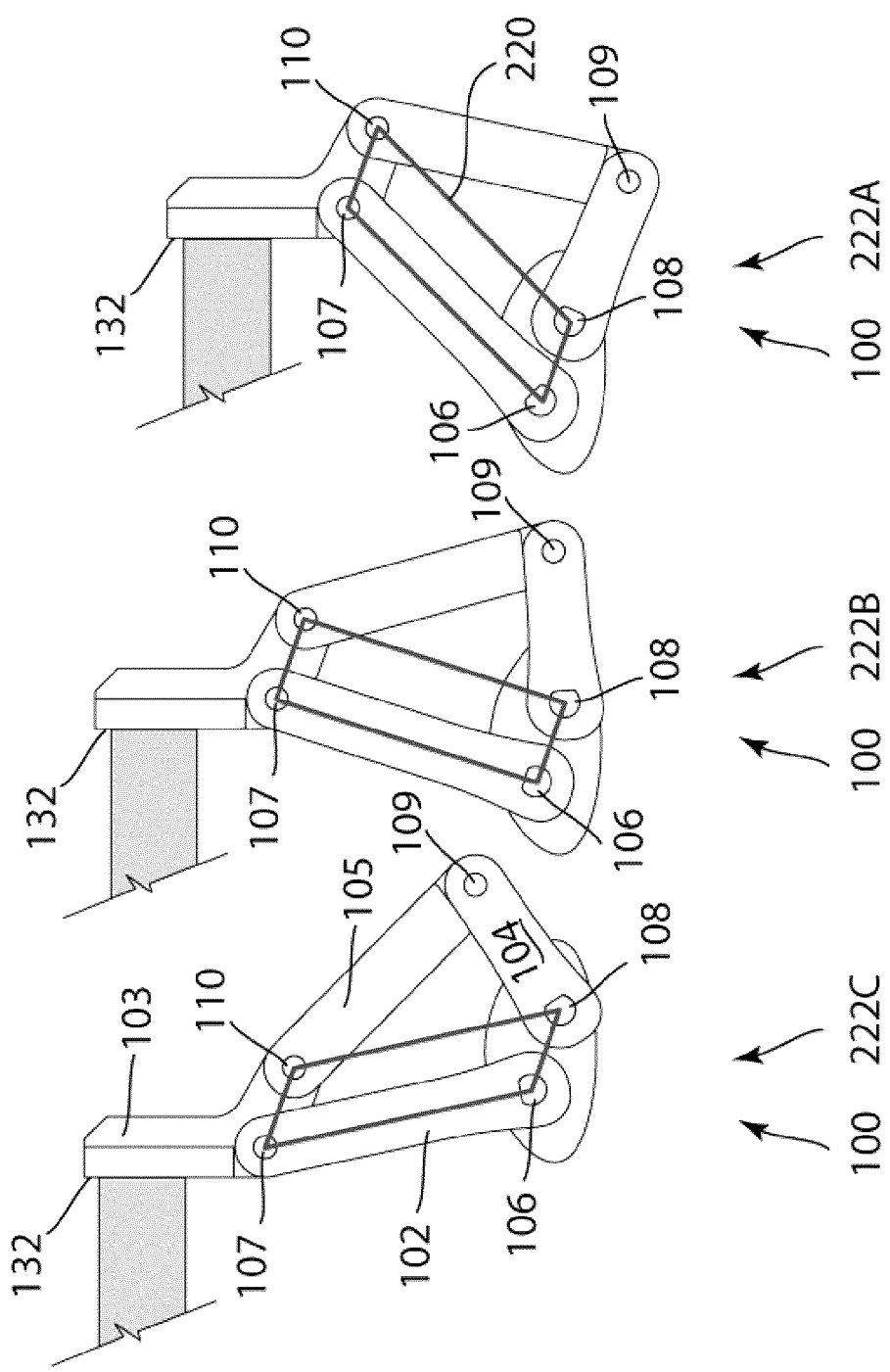
FIG. 2D is a front view representation of the finger geometry as the second phalanx travels from an open position to a closed position when a load is applied within the stable pinch grasp region, according to one embodiment.

When the mechanical stopper 121 is engaged, the geometry of the finger is designed in such a way that the connection joints (106, 107, 108 and 110) form a parallelogram shape 220 as presented in FIG. 2D. This characteristic allows the second phalanx 103 to remain perpendicular or at least transverse to the palm 125, thereby allowing a relatively complete travel of the finger 100, as presented in FIG. 2D. The same is applicable when a load is applied on the stable pinch grasping region 202 of FIG. 2C.

Figure 4:
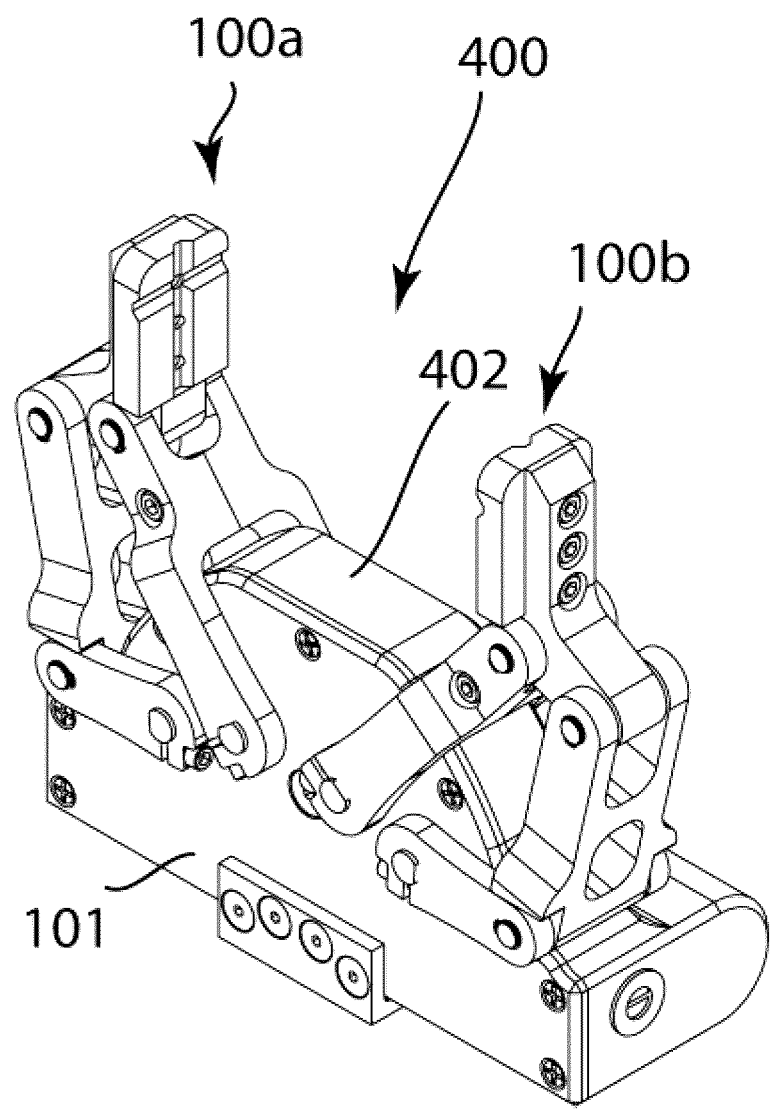
FIG. 4 is a perspective view representation of the gripper having two fingers that are pivotally connected to a base such as to span over a palm portion of the base at opposite ends thereof, according to one embodiment.

In an embodiment where two fingers are connected to the mechanical casing 101 such as presented in FIG. 4, this characteristic allows the contact surface 132 to remain perfectly parallel and, therefore, to perform a pinch grasp for the complete closing range of the gripper. The same is applicable when a load is applied on the stable pinch grasping region 202 of FIG. 2C.

Figure 2E:
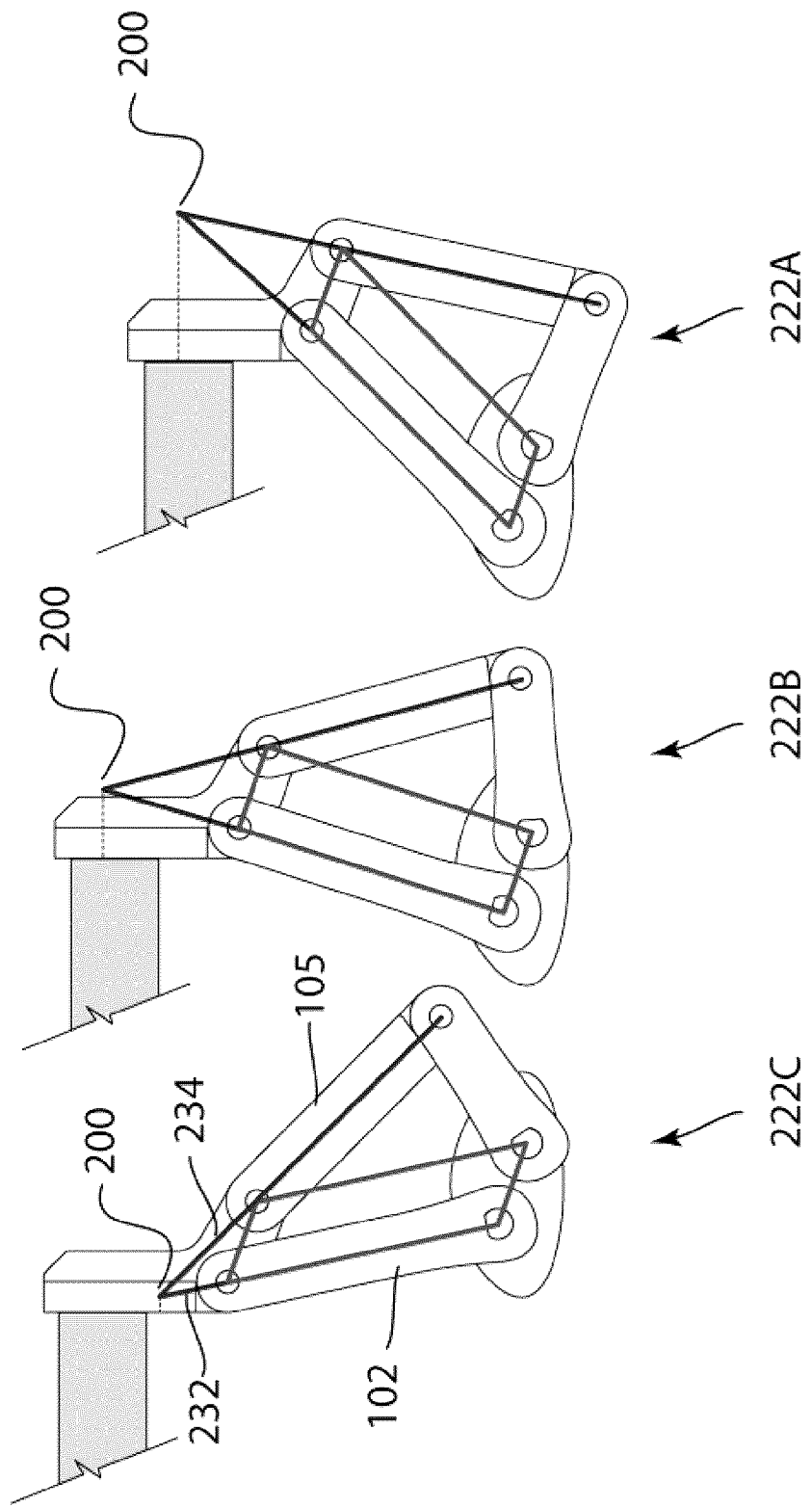
FIG. 2E is a front view representation of the lines of force acting within the finger as the second phalanx travels from an open position to a closed position when a load is applied within the stable pinch grasp region, according to one embodiment.

Presented in FIG. 2E, there is a representation of the finger that travels from a fully open position 222A to a fully closed position 222C. The location of the equilibrium point 200 is illustrated for each corresponding position (222A, 222B and 222C). It can be noticed that the location of the equilibrium point 200 changes as the finger travels from the open potion 222A to the closed position 222C. The equilibrium point 200 is defined as the intersection of a first line of force 232 from a reactive force in the first phalanx 102 and a second line of force 234 from a reactive force in the second link 105, the equilibrium point 200 changes as the orientation of the first phalanx 102 and the orientation of the second link 105 changes.

According to one embodiment and as presented in FIGS. 2C and 2E, the geometry of the system is such that the equilibrium point 200 that is projected onto the contact surface 132 remains within a lower portion of the longitudinal length of the contact surface 132. The lower portion of the longitudinal length measuring at the most eighty percent of the total longitudinal length of the contact surface 132. Thus the stable pinch grasp region 202 has a longitudinal length that measures at least twenty percent of a longitudinal length of the contact surface 132 as the second phalanx travels from a fully open position 222A to a fully closed position 222C.

Figure 2F:
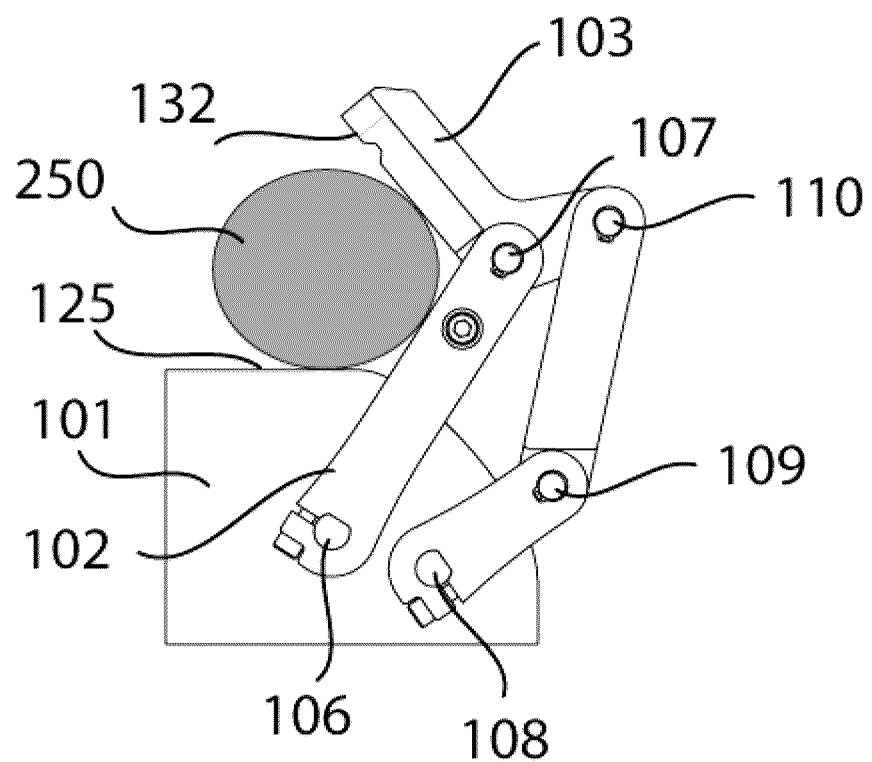
FIG. 2F is a front view representation of the finger as it is providing with a palm an encompassing grasp of an object when the object applies a load within the encompassing grasp region, according to one embodiment.

Presented in FIG. 2F there is the finger 100 that is grasping an object 250 with the palm 125 in an encompassing grasp. The encompassing grasp is achieved when the object 250 applies a load on the first phalanx 102 or the second phalanx 103 below the equilibrium point of the phalanges (102 and 103), such as on the encompassing grasp region 204 of FIG. 2C.

When the object applies an initial load solely on the first phalanx 102, the second phalanx 103 rotates around the distal connection joint 107 until the contact surface 132 abuts against the object 250 and the object is immobilized between the first phalanx 102, the second phalanx 103 and the palm 125; or until the mechanical stopper 122 is reached.

Similarly, if an initial load is applied on the second phalanx 103 but below the equilibrium point (i.e. encompassing grasp region 204 of FIG. 2C), when actuated, the second phalanx rotates around the distal connection joint 107 until the contact surface 132 abuts against the object 250 and the object is immobilized between the first phalanx 102, the second phalanx 103 and the palm 125. However depending on the object size and shape, the object may also be immobilized only between the first phalanx 102 and the second phalanx 103. If the shape and size of the object 250 is too small for being grasped by the finger 100, in encompassing mode, the second phalanx 103 will rotate around the distal connection joint 107 until the mechanical stopper 122 is reached.

Moreover as the second phalanx 103 rotates around the distal connection joint 107, the first phalanx 102 is driven backward by pivoting around the proximal connection joint 106. As further presented in FIG. 2F, a stable encompassing grasps is provided since several contact points constrain the grasped object. Therefore, friction is not necessarily required for holding the load.

Figure 1:
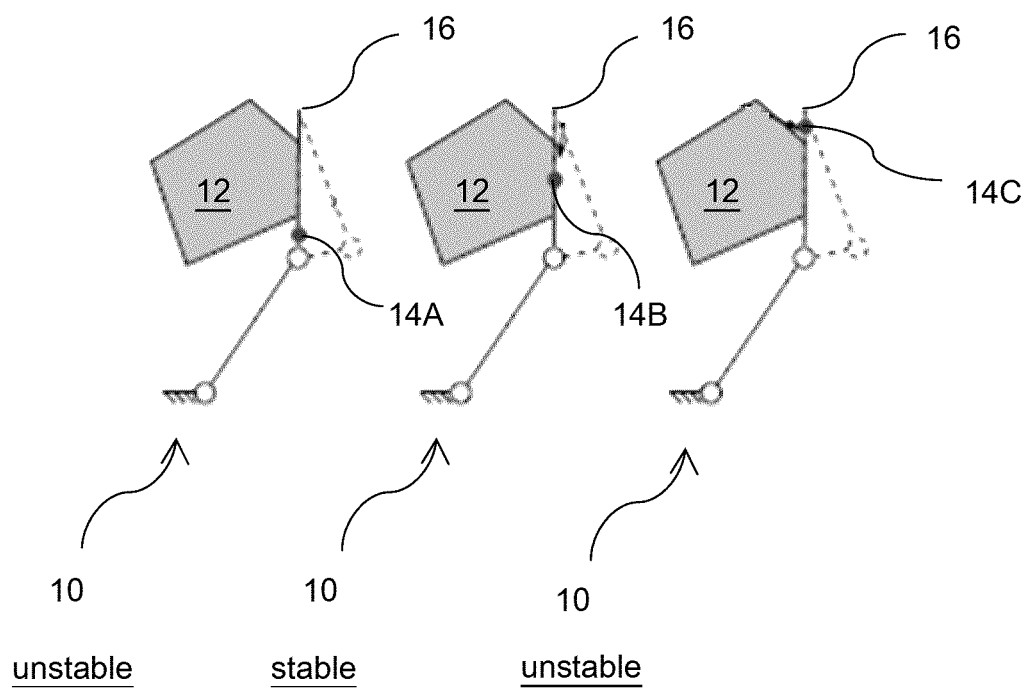
FIG. 1 is a prior art representation of an underactuated finger having two phalanges where a load must be located right on the equilibrium point for providing a stable pinch grasp.
Figure 3A:
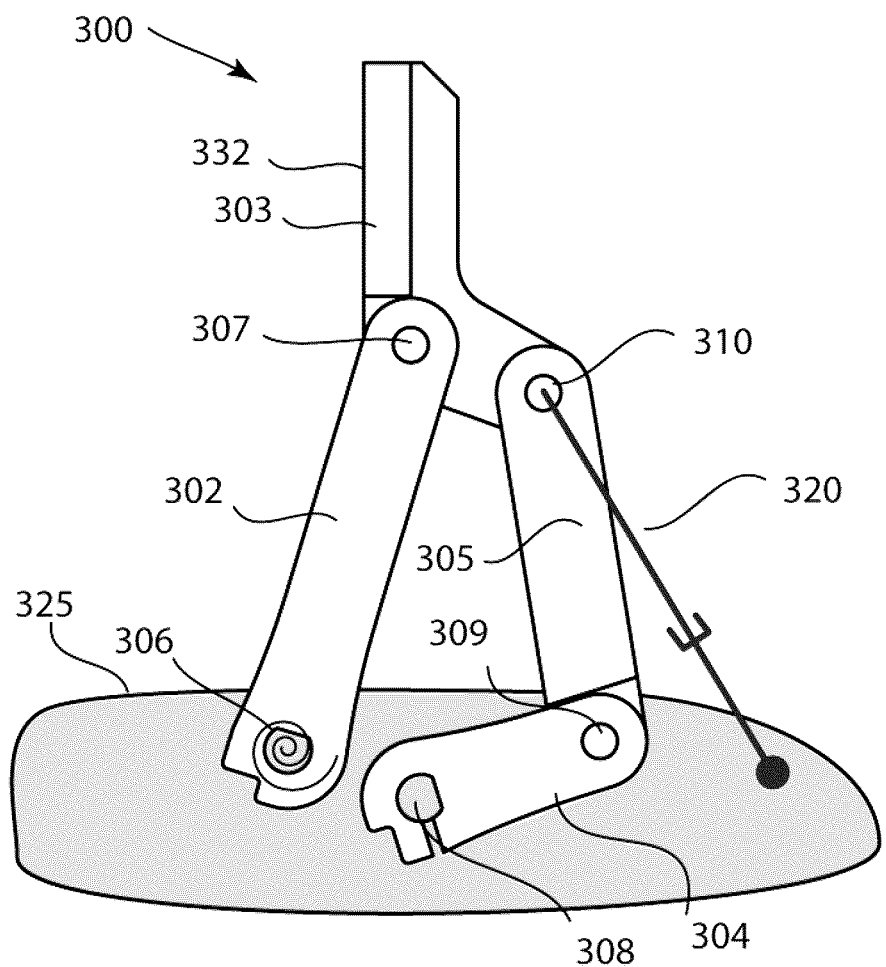
FIG. 3A is a front view representation of the finger having an actuation mechanism that is a linear actuator, according to one embodiment.

It should be understood that other mechanical equivalents of the finger 100 are possible without departing from the scope of the present invention. For instance in FIG. 3A, there is a finger 300 that is similar to the finger 100 of FIG. 1. However, this finger 300 is actuated by a linear actuator 320 that is pivotally connected to the second phalanx 303. The linear actuator 320 is adapted to provide a translation movement to the second phalanx 303 when no load is applied to the finger 300 or when a load is applied to the stable pinch grasp region. When a load is applied below the stable pinch grasp region, the linear actuator 320 is adapted to provide a rotation movement to the second phalanx 303.

Figure 3B:
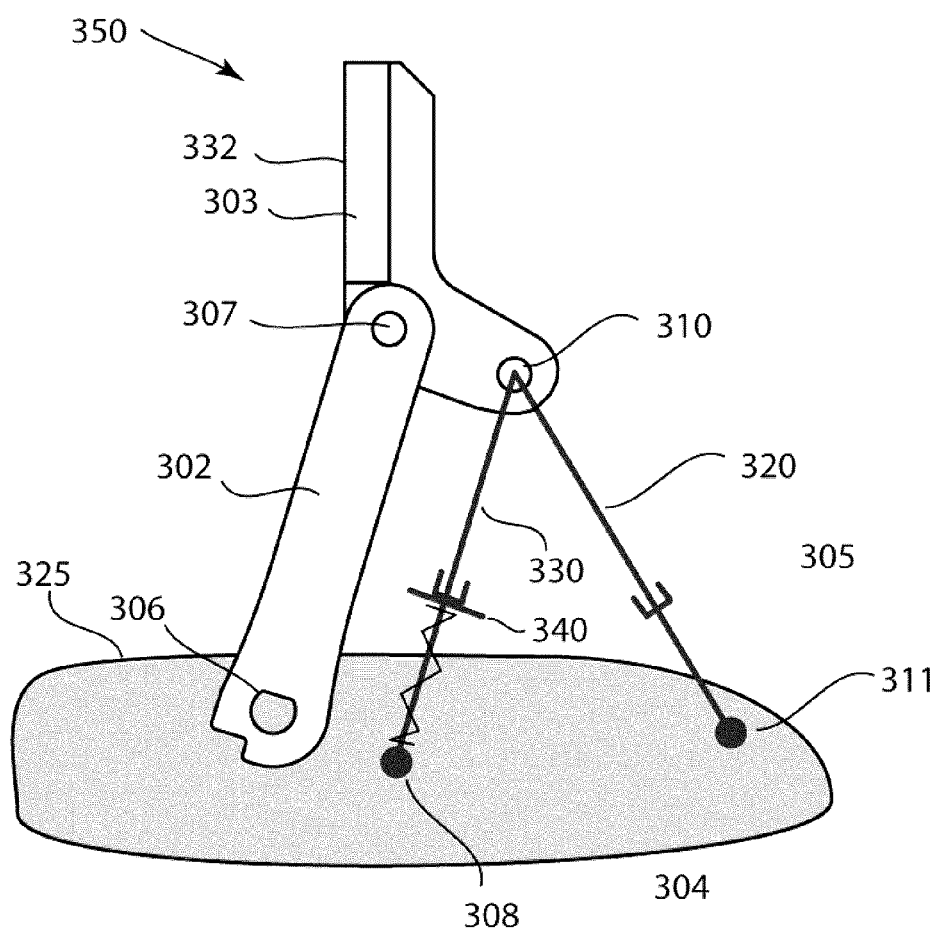
FIG. 3B is a front view representation of the finger having a resilient element an actuation mechanism that are pivotally connected to a same joint, the actuation mechanism being a linear actuator, according to one embodiment.

In another instance as presented in FIG. 3B, there is a finger 350 that has a first phalanx 302 and a second phalanx 303 that are pivotally connected at a distal connection joint 307. At a distal connection joint 310, a resilient element 330 such as a rod and linear spring system is pivotally connected to the second phalanx. At the same distal connection joint 310, a linear actuator 320 is further pivotally connected to the second phalanx 303.

The resilient element 330 is adapted to bias the second phalanx in a transversal orientation with respect to a palm 325. Thereby, when no load is applied to the finger 350, a contact surface 332 is maintained in a transversal orientation with respect to the palm 325. The resilient element 330 further has a stopper 340 that is adapted to be engaged when the second phalanx 303 is transversely oriented with respect to a palm 125.

The geometry of the finger 350 defines a stable pinch grasp region on the second phalanx 303 and the linear actuator 320 is adapted to provide a translation movement to the second phalanx 303 when no load is applied to the finger 350 or when a load is applied to the stable pinch grasp region. When a load is applied below the stable pinch grasp region, the linear actuator 320 is adapted to provide a rotation movement to the second phalanx 303.

As skilled person will understand that the actuation mechanism (120 or 320) could be pivotally connected to a base that is different from the palm structure (125 or 325). Moreover in the finger 350, the resilient element 330 could be as well pivotally connected to a base that is different from the palm structure 325.

Two Underactuated Fingers

Presented in FIG. 4 according to one embodiment, a gripper 400 has two underactuated fingers 100a and 100b as previously described. The two fingers (100a and 100b) are facing each other and are connected to a single mechanical casing 101. The mechanical casing 101 has a palm 402 that lies between the fingers. The palm defines a fifth contacting surface (the four contacting surfaces being the contacting surfaces defined by the two phalanges) of the gripper that can apply a force against an object.

According to one embodiment, the casing 101 is also a cover for covering either one or all of a transmission mechanism, a motorization unit and a control unit. Presented in FIG. 5A, the gripper 400 has a casing 101 that is also a cover for covering a transmission mechanism 500. In one variant of this embodiment, the transmission mechanism 500 is a single actuator that is adapted to drive the two fingers. The transmission mechanism can take various shapes and forms without departing form the scope of the claimed invention.

Figure 5A:
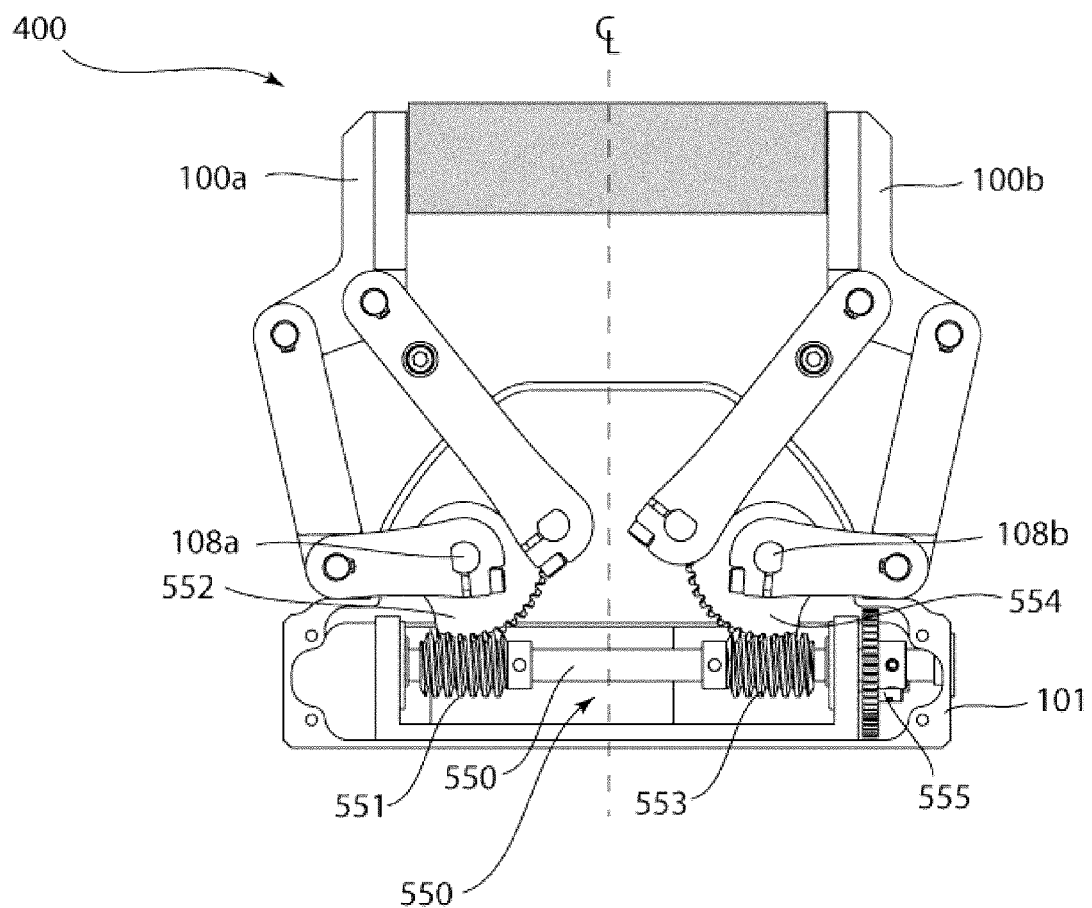
FIG. 5A is a section view representation of the gripper in FIG. 4 showing a single transmission mechanism for controlling the two fingers for providing a self-centered pinch grasp of a load, according to one embodiment.
Figure 5B:
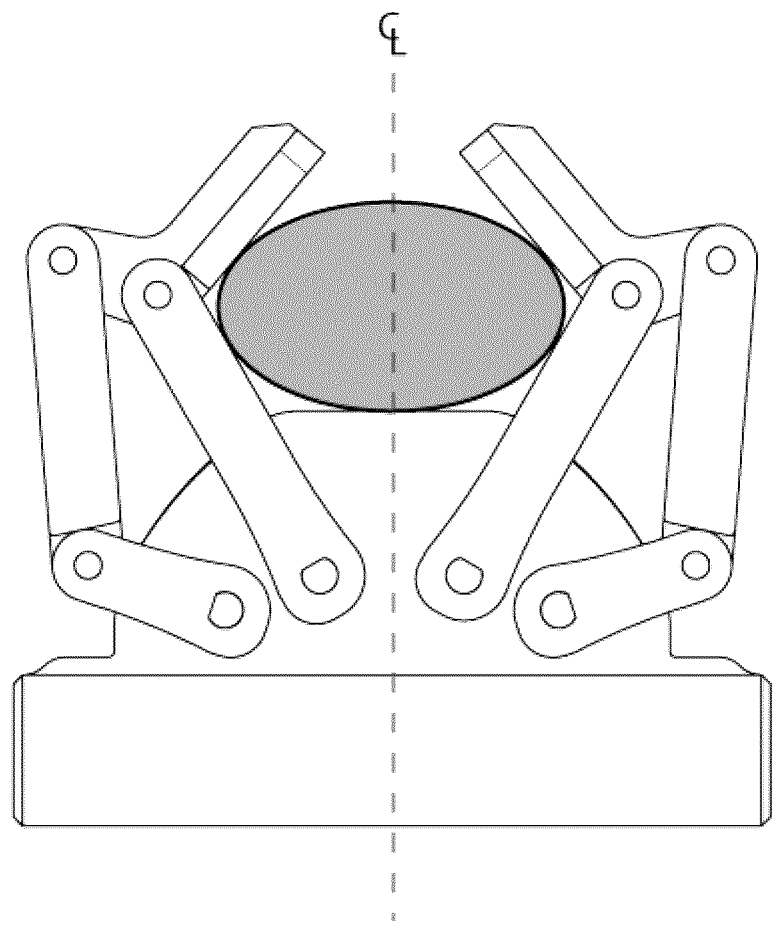
FIG. 5B is a section view representation of the gripper in FIG. 4 showing a single transmission mechanism for controlling the two fingers for providing a self-centered encompassing grasp of a load, according to one embodiment.

According to one variant and as presented in FIG. 5A, the transmission mechanism 500 has a first worm gear 551 and a second worm gear 553 that are each adapted to drive a corresponding one of the proximal connection joints (108a and 108b) in opposite directions. The worm gears (551 and 553) are each attached to a single shaft 550 that is driven by an actuator 555 such as a power transmission or a series of gears that are adapted to be actuated. In this variant, the two fingers (100a and 110b) are adapted to move toward each other and are self-centering. An object grasped in the pinch grasp mode will automatically be centered with respect to the gripper 400 as shown in FIG. 5A. Similarly, an object grasped in the encompassing grasp mode will automatically be centered with respect to the gripper 400 as shown in FIG. 5B, particularly when the object is a symmetric object, such as a cylinder. The self-centering feature is very useful in industrial applications where precise and repeatable positioning is required.

Figure 6:
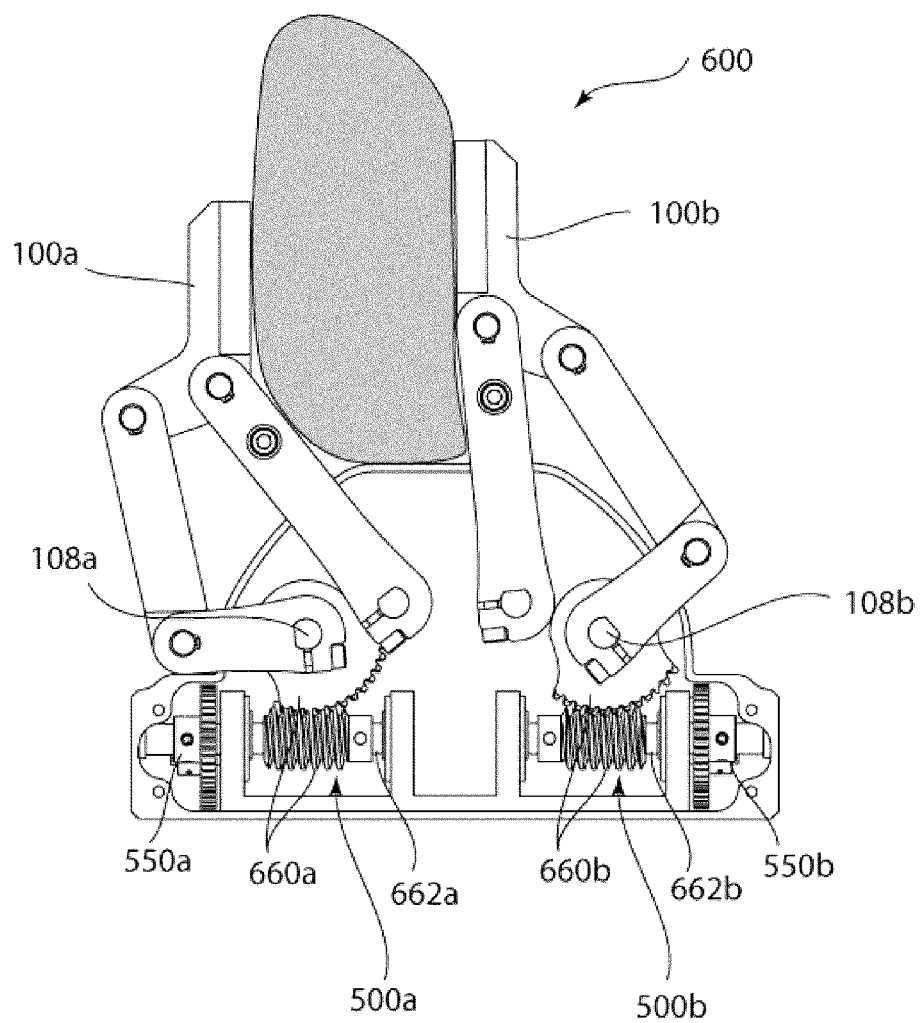
FIG. 6 is a section view representation of the gripper in FIG. 4 showing two transmission mechanisms, each controlling a corresponding one of the two fingers and adapted to provide an independent control of each finger, according to one embodiment.

According to another variant and as presented in FIG. 6, a gripper 600 has fingers (100a and 100b) that are each independently driven by a corresponding first transmission mechanism 500a and a second transmission mechanism 500b. Additional flexibility is provided by the gripper 600 as it is able to independently control each finger (100a and 100b).

According to one embodiment, the first and second transmission mechanisms (500a and 500b) each have a corresponding worm gear (660a and 660b) connected to a corresponding shaft (662a and 662b) which in turn is connected to a corresponding actuator (550a and 550b). The first transmission mechanism 500a is adapted to independently drive the proximal connection joint 108a and the second transmission mechanism 500b is adapted to independently drive the proximal connection joint 108b.

A skilled person would understand that is possible to control the gripper 600 such as if the two fingers would be mechanically underactuated (i.e. only one input command is required to open or close the gripper). Moreover, a skilled person would understand that it is possible to control the gripper 600 such as if the two fingers were mechanically coupled as in the gripper 400.

According to one embodiment, the transmission mechanism (500, 500a or 500b) is a self-locking transmission mechanism. The gripper (400 or 600) having such a transmission mechanism is non-backdrivable, when no power is applied to the actuator (555, 550a or 550b) the gripper (400 or 600) is prevented from opening even when an object is grasped. This feature adds safety to the gripper (400 or 600) since the gripper (400 or 600) will not lose grip of a load or object even if power is lost. Moreover, in some applications, the energy required to operate the gripper (400 or 600) is reduced with the use of such a self-locking transmission mechanism.

Figure 7:
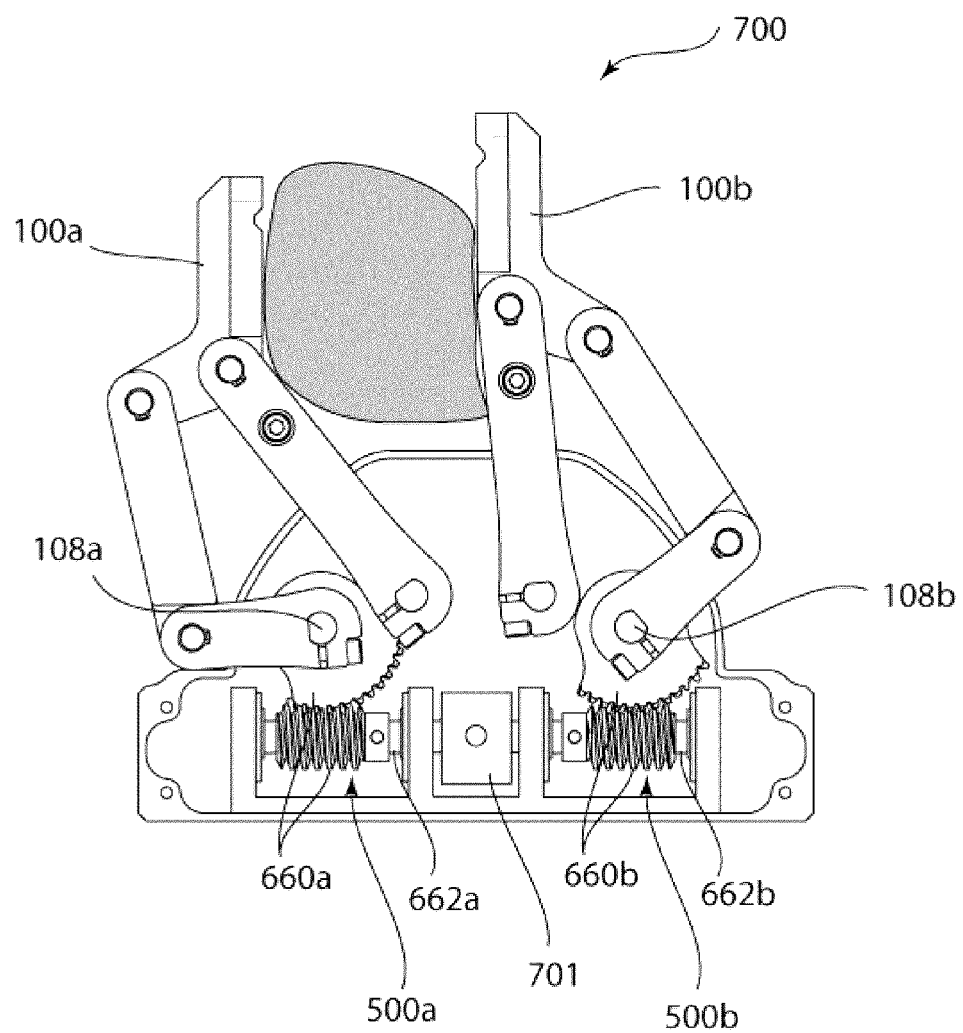
FIG. 7 is a section view representation of the gripper in FIG. 4 showing two transmission mechanisms, each controlling a corresponding one of the two fingers, each being connected to a mechanical differential device, and allowing to drive the two fingers each at a different speed with a single actuator, according to one embodiment.

According to one embodiment and as presented in FIG. 7, a gripper 700 has two transmission mechanisms (500a and 500b) that are each associated to a corresponding finger (100a and 100b). The transmission mechanisms (500a and 500b) are connected to a mechanical differential device 701 or a hyperdifferential device. The mechanical differential device 701 can be any suitable device that is adapted to drive a plurality of fingers each at a different speed, with a single actuator. The mechanical differential device 701 can be a set of gears, a see-saw mechanism, a hydraulic or a pneumatic device, etc. In the gripper 700 that has two fingers (100a and 100b), the first and second transmission mechanisms (500a and 500b) each have a corresponding worm gear (660a and 660b) connected to a corresponding shaft (662a and 662b) which in turn is connected to the mechanical differential device 701.

Gripper with a Plurality of Underactuated Fingers

Figure 8A:
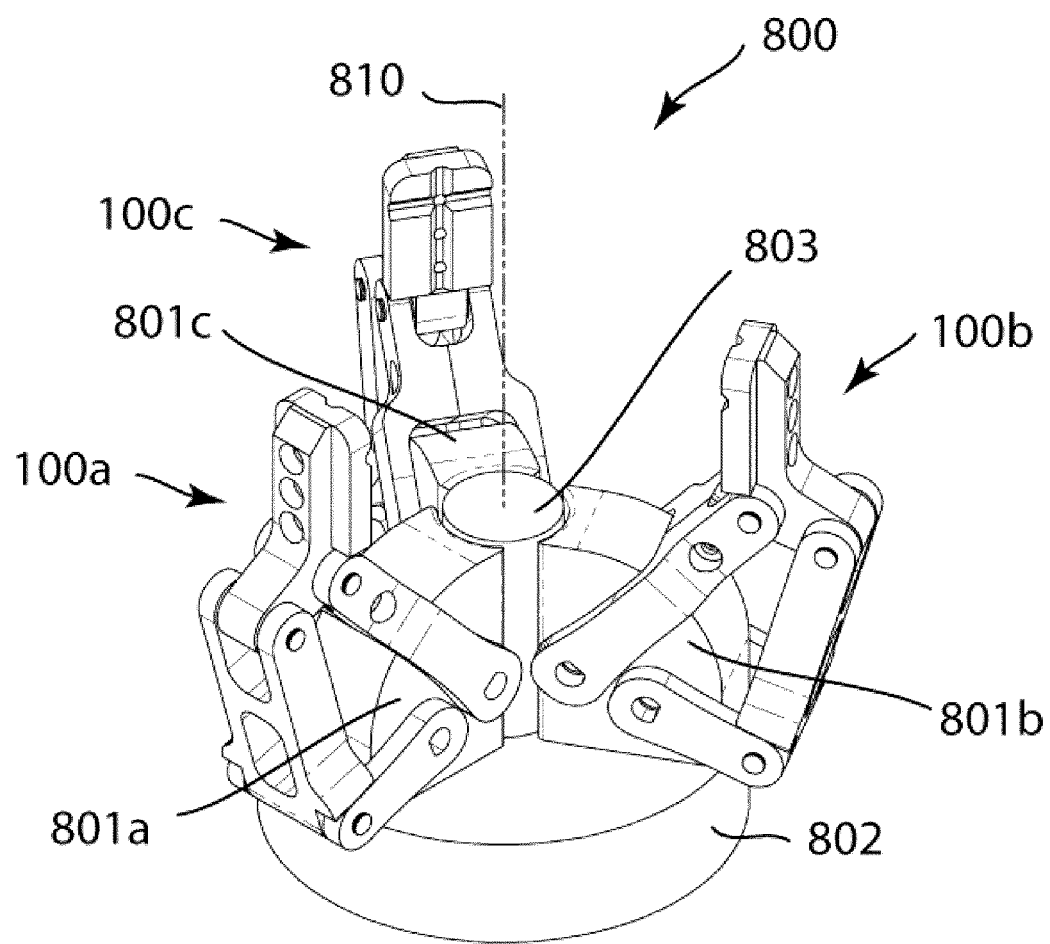
FIG. 8A is a perspective representation of the gripper having three underactuated fingers, according to one embodiment.
Figure 8B:
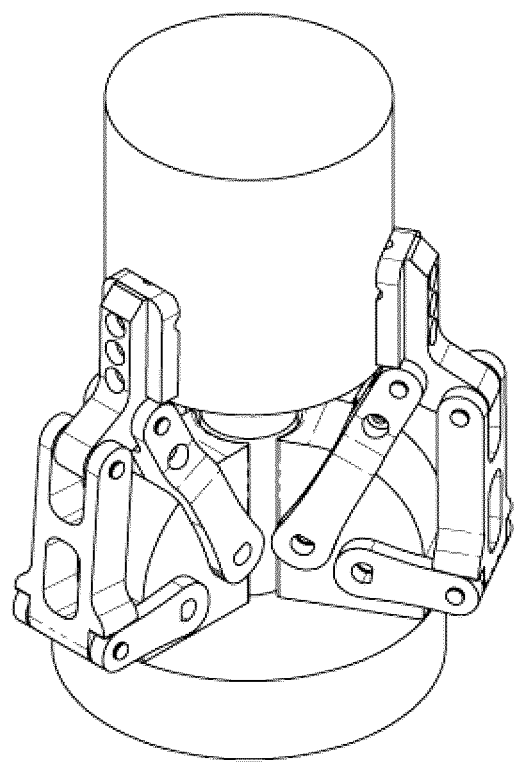
FIG. 8B is a perspective representation of the gripper of FIG. 8A providing a pinch grasp of a cylindrical object, according to one embodiment.
Figure 8C:
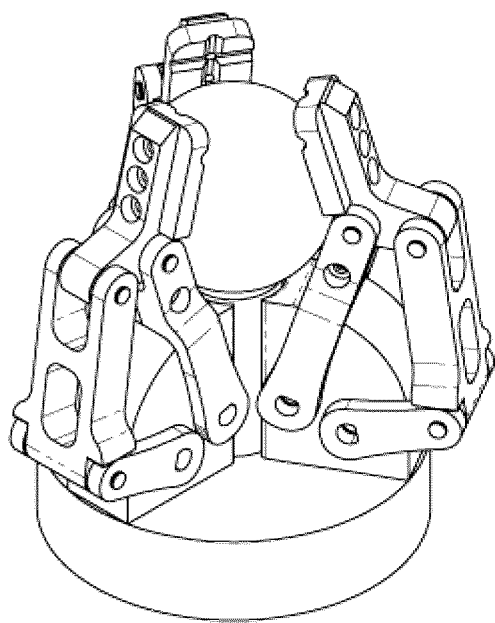
FIG. 8C is a perspective representation of the gripper of FIG. 8A providing an encompassing grasp of a spherical object, according to one embodiment.

Presented in FIG. 8A, according to one embodiment, a gripper 800 has three underactuated fingers 100a, 100b and 100c as previously described. The three fingers (100a, 100b and 100c) are each connected to a corresponding casing (801a, 801b and 801c). The casings (801a, 801b and 801c) are pivotally connected to a mechanical casing 802 and are adapted to rotate about an axis 810. In FIG. 8A, a configuration where the fingers (100a, 100b and 100c) are arranged in a symmetrical way is presented but any configuration is possible. The gripper mechanical casing (802) has a plane 803 that lies between the fingers. The plane is used as a palm and defines a seventh contacting surface (the six contacting surfaces being the contacting surfaces defined by the three phalanges) of the gripper that can apply a force against an object. FIG. 8B shows a pinch grasp of a cylindrical object with the gripper 800, while the FIG. 8C shows an encompassing grasp of a spherical object.

A skilled person will understand that the various embodiments of the gripper could have additional fingers without departing from the scope of the claimed invention. For instance in one embodiment, more than two fingers could be adapted to be actuated individually. In another embodiment, more than two fingers could be coupled for being adapted to be driven by a single actuator. In yet another embodiment, more than two fingers could be coupled with a mechanical differential device for being adapted to be driven by a single actuator.

Figure 9:
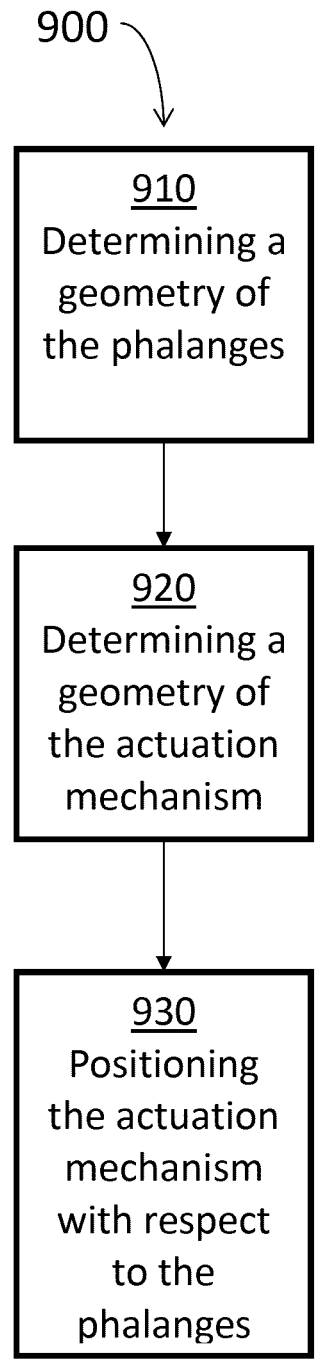
FIG. 9A is a flow chart diagram of a method for determining a geometry of the mechanical finger, according to one embodiment.
FIG. 9B is a front view representation of the finger geometry that defines an acceptable parallelogram shape for performing a pinch grasp when a load is applied within the stable pinch grasp region, according to one embodiment.
Figure 9:
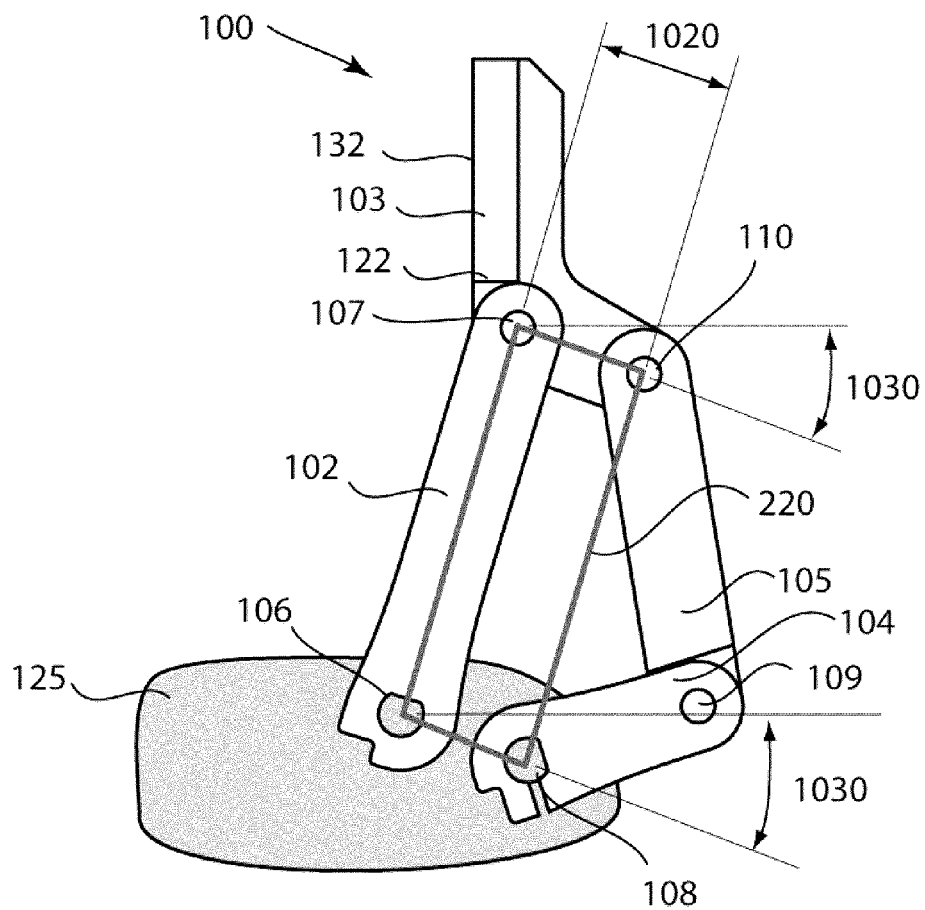

According to another aspect and as presented in FIG. 9A, there is a method 900 for determining a geometry of the mechanical finger 100 for obtaining a desired stable pinch grasp region 202 on the contact surface 132, as concurrently presented in FIG. 2C. Depending on the expected use of the finger 100, the desired stable pinch grasp region 202 could differ. In some instances a relatively short length of the stable pinch grasp region 202 may be desirable while in other instances a longer length may be desirable. The method 900 requires determining a geometry of the phalanges 910, determining a geometry of the actuation mechanism 920 and positioning the actuation mechanism with respect to the phalanges 930.

Figure 10:
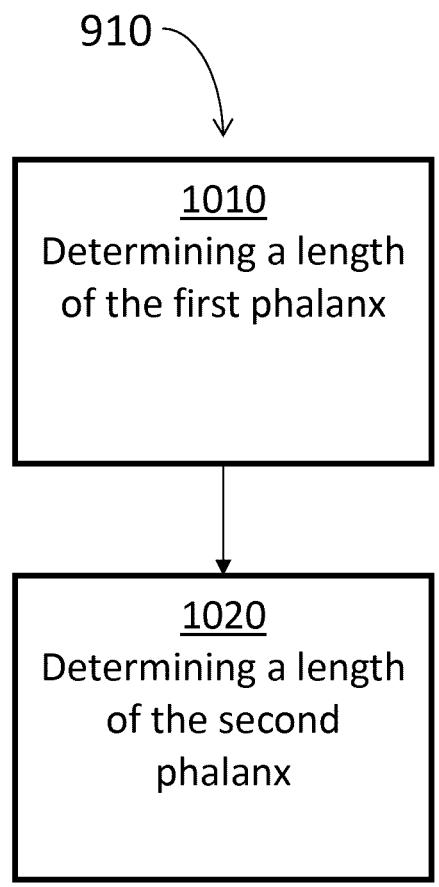
FIG. 10 is a flow chart diagram of a method for determining a geometry of the phalanges, according to one embodiment.

According to one embodiment and as presented in FIG. 10, determining a geometry of the phalanges 910 requires determining a length 1010 of the first phalanx 102 and determining a length 1020 of the second phalanx 103. The length and shape of the phalanges is determined according to the shape and dimension of the objects that are destined to be grasped by the finger 100.

Figure 11:
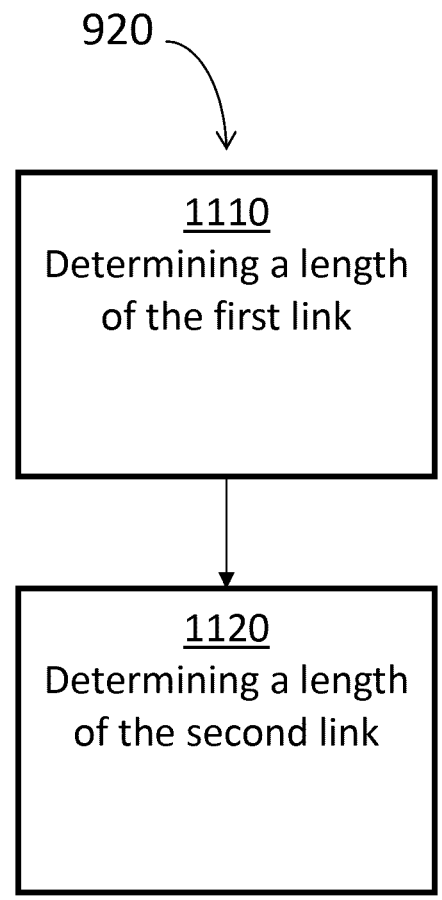
FIG. 11 is a flow chart diagram of a method for determining a geometry of the actuation mechanism, according to one embodiment.

According to one embodiment and as presented in FIG. 11, determining a geometry of a differential actuation mechanism 920 requires determining a length (1110 and 1120) for each link of the actuation mechanism. In the actuation mechanism 120 of FIG. 2A, a length of the first link 104 and a length of the second link 105 is determined according to the geometry of the phalanges and the desired stable pinch grasp region 202.

According to one embodiment, the length of the first link 104 and the length of the second link 105 are determined (1110) according to an acceptable parallelogram shape 220, as presented in FIG. 9B. The parallelogram shape 220 being defined by the finger 100 travelling from a fully open position 222A to an intermediate position 222B and then to a fully closed position 222C, as presented in FIG. 2D. The acceptable parallelogram shape 220 defines an acceptable distance 1020 of a lower segment defined by the proximal connection joints (106 and 108) and of an upper segment defined by the distal connection joints (107 and 110). The acceptable parallelogram shape 220 further defines an acceptable deviation angle 1030 of the corresponding lower and upper segments with respect to a plane that is parallel to the palm 125. Therefore, it can also be said that the length of the links (104 and 105) are determined to respect the acceptable distance 1020 and the acceptable deviation 1030.

Returning to FIG. 9A, the positioning 930 of the actuation mechanism 120 with respect to the phalanges (102 and 103) is also done according to the acceptable distance 1020 and the acceptable deviation angle 1030.

A skilled person will understand that the various steps in determining the geometry of the system 900 are interrelated and could be performed in a different order than the one that is being presented.

Moreover it shall be understood that the determining of the geometry of the system 900 can further depend on various other factors such as the force required within the stable pinch grasp region for effectively performing a pinch grasp or the acceptable dimensions of the phalanges or of the actuation mechanism for being able to effectively perform a pinch grasp and an encompassing grasp depending on the area of application.

Figure 12:
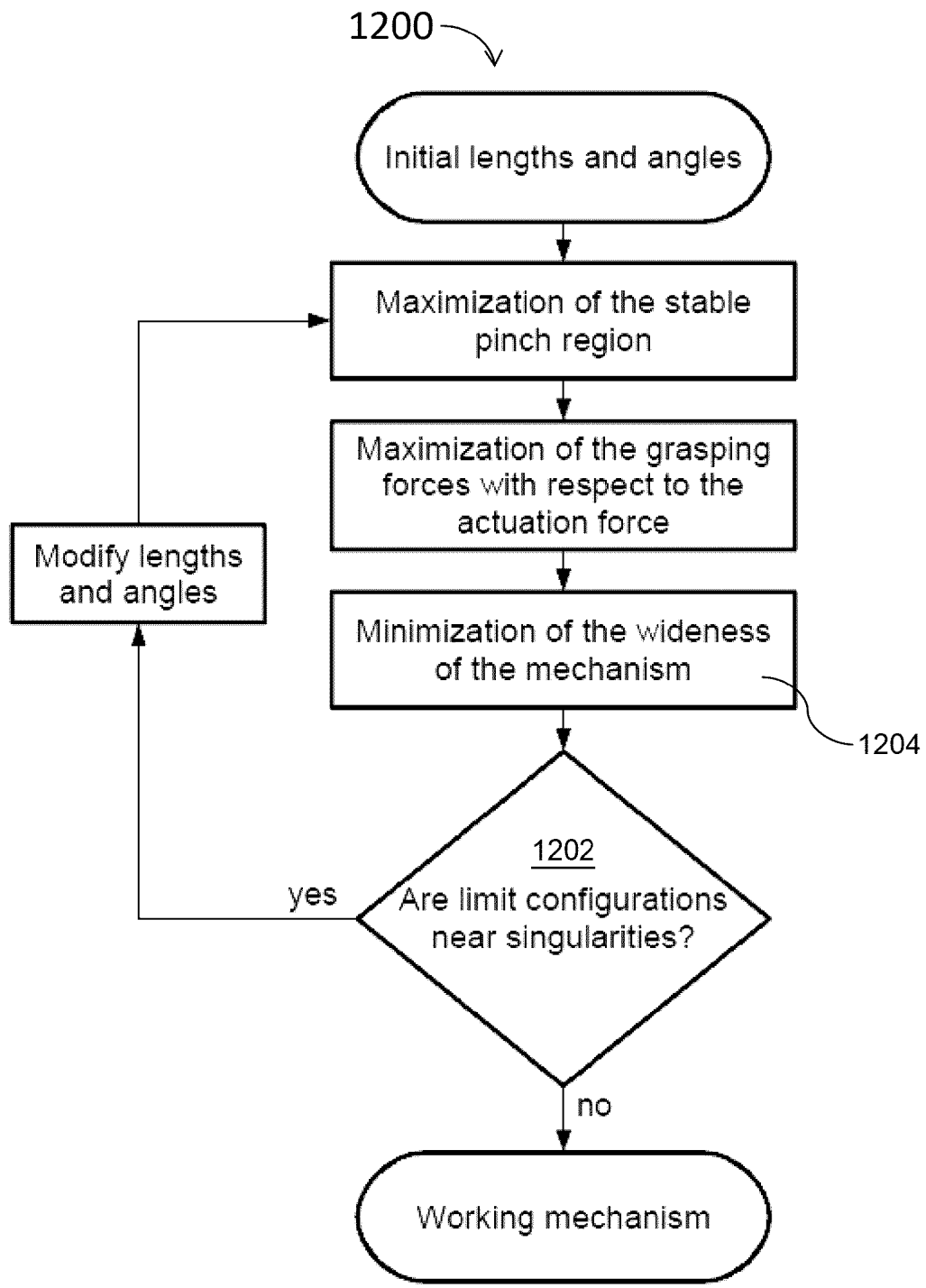
FIG. 12 is a flow chart diagram of a method for optimizing a gripper geometry, according to one embodiment.

As presented in FIG. 12, there is a method of optimizing the gripper geometry 1200. The method 1200 takes into account the limit configurations of the mechanism in order to avoid singularities 1202, i.e. situations where the mechanism is no more actionable and therefore useless. This explains why the equilibrium point cannot be lowered to the proximal joint 107 of the distal phalanx 103.

In addition to obtaining a relatively low equilibrium point, the mechanical finger is optimized with respect to its wideness 1204, in such a way that the actuation mechanism is compact and does not span too far from the phalanges. This feature is necessary to help taking objects in closer environments for instance.

As stated above, the pinch grasp is an important feature in the industrial field to ensure the precision of the placement and to pick certain types of objects, such as small parts. In the above described embodiments of the gripper the lengths and angles of the joints with respect to each other are determined to lower the location of the equilibrium point on the distal phalanx 103. This allows to provide a longer stable pinch grasp region for a load to be automatically pinch grasped without the use of an additional mechanism.

Figure 13:
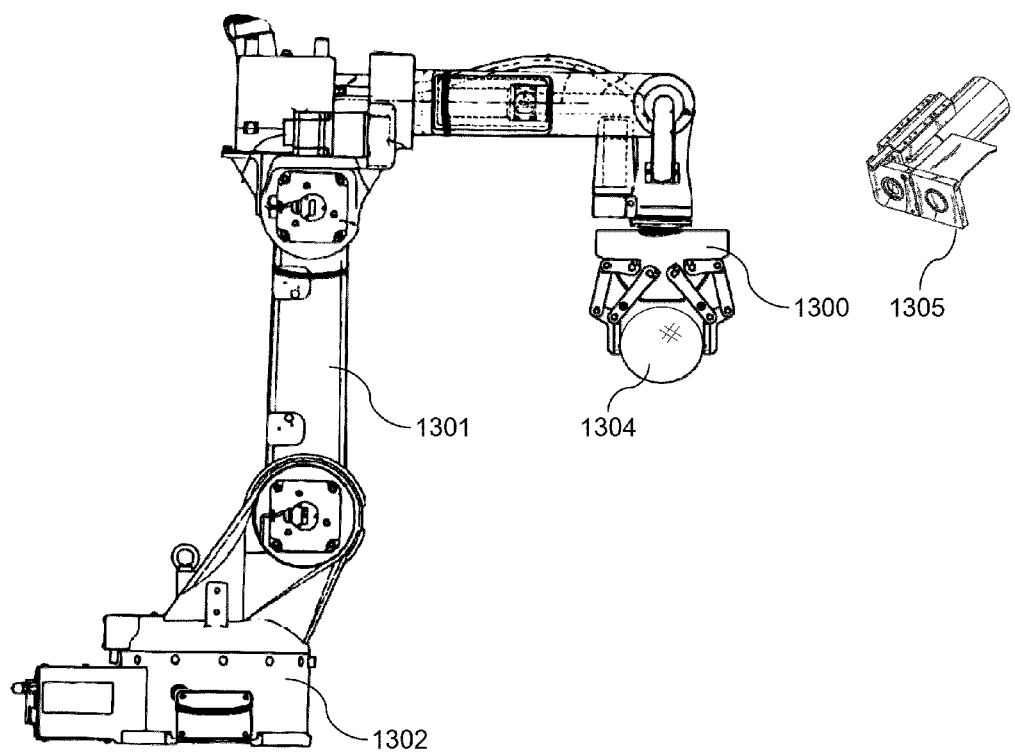
FIG. 13 is a side view of a robot having a gripper mounted on a positioning arm and a sensor for detecting the position of the object relative to the gripper to selectively perform by positioning the gripper a pinch or an encompassing grasp.

FIG. 13 illustrates a robot having a two-phalanx finger gripper 1300 supported by a positioning arm 1301. In the embodiment shown, the gripper 1300 has two opposed fingers. The gripper 1300 is positioned to grasp an object 1302 using a motion controller 1302 for the position arm 1301 and a position sensor 1304. The sensor 1304 can be a computer vision system, light beam interrupt detection system, contact switch, magnetic or capacitive sensor or the like. The sensor 1304 can detect the position of the object relative to the gripper 1300. The controller 1302 is configured to read data from the sensor 1304 and to cause the positioning system 1301 to position the gripper 1300 relative to the object 1302 to perform selectively a desired one of a pinch grasp and an encompassing grasp as described above, for example with reference to FIG. 2E and the equilibrium point 200. Thus, the controller 1302 chooses which side of the equilibrium point to contact the object with the second phalanx, and thus whether the grasp that follows on the object will be a pinch grasp or an encompassing grasp.

Thus, in some embodiments, a desired one of a pinch grasp and an encompassing grasp for grasping an object is first selected. Then gripper is then moved relative to the object so as to position contact between the object and the gripper. When a pinch grasp is selected, a load is applied on the stable pinch grasp region, and the actuation mechanism allows the second phalanx to translate and allow its contact surface to maintain a constant orientation in order to automatically perform a pinch grasp. When an encompassing grasp is selected, a load is applied on the first phalanx or below the stable pinch grasp region, and the actuation mechanism allows the second phalanx to pivot and automatically perform an encompassing grasp.

What is claimed is:

1. A mechanical gripper adapted to automatically perform a stable pinch grasp and an encompassing grasp, the gripper comprising:
at least one mechanical finger comprising:
a first phalanx that is pivotally connectable at a proximal end;
a second phalanx having a contact surface for contacting a load, the second phalanx being pivotally connected at a proximal end to the distal end of the first phalanx; and
a differential actuation mechanism being connected to the second phalanx, the actuation mechanism defining at least in part a stable pinch grasp region on the contact surface such as when a load is applied on the stable pinch grasp region, the actuation mechanism is adapted to allow the second phalanx to translate and allow its contact surface to maintain a constant orientation in order to automatically perform a pinch grasp, when a load is applied below the stable pinch grasp region on the second phalanx, the actuation mechanism is adapted to allow the second phalanx to pivot and automatically perform an encompassing grasp, and when a load is applied on the first phalanx, the actuation mechanism is adapted to allow the second phalanx to pivot and automatically perform an encompassing grasp, wherein the differential mechanism comprises one of:
a rotatable first link, a second link pivotally mounted to the first link at a proximal end and pivotally mounted to the second phalanx at a pivot point to permit the first and the second link to form essentially a parallelogram with the first and the second phalanges, the dimensions of the first and the second links and the parallelogram being chosen to define at least in part the stable pinch grasp region; and
a linear motion link pivotally mounted to the second phalanx at a pivot point to form essentially a parallelogram with the first and the second phalanges, the dimensions of the parallelogram being chosen to define at least in part the stable pinch grasp region.

2. The mechanical gripper of claim 1, wherein the stable pinch grasp region has a longitudinal length that measures at least twenty percent of a longitudinal length of the contact surface as the second phalanx travels from a fully open position to a fully closed position.

3. The mechanical gripper of claim 1, wherein a geometry of the differential actuation mechanism is determined according to a geometry of the first phalanx and a desired stable pinch grasp region.

4. The mechanical gripper of claim 1 further comprising a base and the first phalanx being pivotally connected to the base at the proximal end.

5. The mechanical gripper of claim 4, wherein the base has a palm surface, the palm surface being adapted to stabilize a load when performing the encompassing grasp.

6. The mechanical gripper of claim 4, wherein the at least one mechanical finger transversally forks over and spans across the base.

7. The mechanical gripper of claim 6, wherein the first phalanx comprises a fork portion between the proximal end, the fork portion being adapted to fork over and span across the base.

8. The mechanical gripper of claim 4, wherein the actuation mechanism comprises a first link that is pivotally connected at a proximal end to the base and a second link that is pivotally connected at a proximal end to a distal end of the first link and is pivotally connected at a distal end to the second phalanx.

9. The mechanical gripper of claim 4, wherein the second link comprises a stopper at a proximal end to maintain the contact surface in a transversal orientation with respect to the base when no load is applied to the at least one mechanical finger or when a load is applied to the stable pinch grasp region.

10. The mechanical gripper of claim 9, wherein the at least one finger is biased to engage the stopper.

11. The mechanical gripper of claim 1, wherein the gripper comprises two said mechanical fingers that are oppositely spaced apart and oriented with respect to each other so as to together provide a pinch grasp of a load when the load is applied within the stable pinch grasp region.

12. The mechanical gripper of claim 1, wherein each of the at least one mechanical fingers is connected to a single drive mechanism, the single drive mechanism being for driving a corresponding one of the actuation mechanism.

13. The mechanical gripper of claim 12, wherein the single drive mechanism is located within a base to which the actuation mechanism is connected.

14. The mechanical gripper of claim 1, wherein the second phalanx comprises a flexion stopper to prevent the second phalanx to rotate beyond a predetermined angle.

15. The mechanical gripper of claim 1, further comprising an additional mechanical finger that is pivotally connected in opposition with the at least one mechanical finger, the additional mechanical finger defining a similar stable pinch grasp region, the additional mechanical finger being oriented with respect to the at least one mechanical finger so as to provide a pinch grasp of a load when the load is applied within the stable pinch grasp region of both the at least one mechanical finger and the additional mechanical finger.

16. A robot comprising:
a mechanical gripper as defined in claim 1;
a positioning system configured to move said gripper relative to an object;
at least one sensor for detecting a position of said object relative to said gripper; and
a controller configured to read said sensor and to cause said positioning system to position said gripper relative to said object to perform selectively a desired one of a pinch grasp and an encompassing grasp.

17. A method of performing a grasp using a mechanical gripper as defined in claim 1, the method comprising:
selecting a desired one of a pinch grasp and an encompassing grasp for grasping an object;
moving said gripper relative to said object so as to position contact between the object and the gripper,
wherein, for a pinch grasp, a load is applied on the stable pinch grasp region, and the actuation mechanism allows the second phalanx to translate and allow its contact surface to maintain a constant orientation in order to automatically perform a pinch grasp, and
wherein, for an encompassing grasp, a load is applied on the first phalanx or below the stable pinch grasp region, and the actuation mechanism allows the second phalanx to pivot and automatically perform an encompassing grasp.

* * * * *